Patented Mar. 2, 1937

2,072,401

UNITED STATES PATENT OFFICE 2,072,401

PHENYL-PYRIDINIUM SULPHONIC ACID DYESTUFFS AND A PROCESS OF PREPARING THEM

Ernst Koenigs, Breslau, and Edgar Ruppelt, Waldenburg, Germany, assignors to General Aniline Works, Inc., New York, N. Y., a corporation of Delaware No Drawing. Application October 17, 1934, Serial No. 748,762. In Germany October 18, 1933

8 Claims. (Cl. 260—42)

The present invention relates to phenyl-pyridinium sulphonic acid dyestuffs and to a process of preparing them.

We have found that dyestuffs of technical importance are obtainable by sulphonating compounds of the general formula:

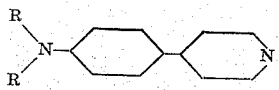

wherein R represents alkyl or aralkyl and wherein the nuclei may be substituted, (cf. German Patent No. 507,562 and "Annalen der Chemie", vol. 509, pages 142–158) or their quaternary pyridinium compounds which are formed in known manner, for instance, by the action of benzyl chloride, diethyl sulphate, ethyl iodide, chloroacetic ester, hydrochloric acid or the like, the sulphonic acids so obtained, when they are not already quaternary pyridinium compounds, being transformed into quaternary pyridinium compounds. The conversion into the pyridinium compounds and the sulphonation may also be effected in one single operation, for instance, by using chlorobenzyl sulphonic acid or chloroethane sulphonic acid or the like.

The dyestuffs thus obtained are new. They may be characterized by the following formula:

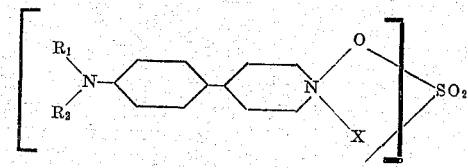

wherein $R_1$ and $R_2$ represent an alkyl or an aralkyl group of the benzene series and X represents hydrogen, alkyl, aralkyl or a $CH_2COO$ alkyl group.

They are distinguished by beautiful greenish-yellow shades having a green fluorescence. They are suitable for dyeing wool and natural silk, partly also for dyeing acetate silk.

The following examples serve to illustrate the invention, but they are not intended to limit it thereto; the parts are by weight:

(1) 2 parts of para-dimethylamino-phenyl-pyridine are suspended in 10 parts of alcohol and, after addition of 1.3 parts of benzylchloride, the whole is boiled for 2 hours. The alcohol is then evaporated and the orange-red residue is recrystallized from about 50 parts of water with addition of a small quantity of animal charcoal. Orange leaflets are obtained which contain 2 mols water of crystallization. On drying, the product becomes light yellow and melts then at 265° C.

3 parts of concentrated sulphuric acid are poured upon 1 part of dimethylamino-phenyl-pyridine-chlorobenzylates obtained as above described, whereby brisk evolution of hydrochloric acid takes place. As soon as this evolution has decreased, 3 parts of fuming sulphuric acid (containing 70% of sulphuric anhydride) are added thereto and the whole is heated for 1 hour at 100° C. After cooling, the mixture is poured on ice, caustic soda solution is added until the whole begins to become turbid and, thereupon, the sulphonic acid is precipitated by addition of sodium acetate. The acid is recrystallized from 150 parts of water and thus obtained in the form of reddish-yellow sometimes clustered needles which, when rapidly heated, begin to sinter at about 200° C. and decompose at 307° C. while frothing. The sulphonic acid dyes acetate silk as well as wool greenish-yellow tints.

(2) 2.3 parts of diethylamino-phenyl-pyridine are reacted with 1.2 parts of benzyl chloride in the manner described in Example 1 and the quaternary chloride is isolated in the aforesaid manner. Red leaflets, which contain 2 mols of water of crystallization, are obtained; the dry product melts at 283° C.

The diethylamino-phenyl-pyridine-chlorobenzylate thus obtained is sulphonated as described in Example 1. The sulphonic acid dissolves more sparingly than does the dimethyl derivative; it crystallizes in the form of thin long yellow leaflets which when heated become soft and melt at about 240° C. The sulphonic acid dyes acetate silk as well as wool greenish-yellow tints.

(3) 1.3 parts of benzyl chloride are caused to act upon 2.8 parts of methyl-benzyl-amino-phenyl-pyridine in the manner described in Example 1. The chlorobenzylate forms yellow leaflets which contain water of crystallization and melt at 103° C.; after drying, they melt at 215° C.

The compound thus obtainable is sulphonated as described in Example 1. A sulphonic acid is obtained which dyes silk and wool greenish-yellow tints.

(4) 1 part of methyl-benzyl-amino-phenyl-pyridine is heated with 4 parts of fuming sulphuric acid (containing 30% of sulphuric anhydride) for ½ hour at about 50° C. to 60° C. until a test portion dissolves in warm dilute caustic soda solution to a clear solution. The cool solution is poured on ice and an excess of caustic soda solution is added to the hot mass, whereby the sulphonic acid at first precipitates and then dissolves again. If necessary the hot solution is filtered and the sulphonic acid is separated by means of acetic acid, without regard to the colorless sodium salt which precipitates on cooling. The product forms a finely crystalline yellow powder which melts only above 300° C.

(5) 9 parts of methyl-benzyl-amino-phenyl-pyridine-sulphonic acid, obtainable according to Example 4, are suspended in 90 parts of absolute alcohol and, after addition of 1 part of sodium hydroxide, the whole is boiled until the yellow sulphonic acid has been converted into the colorless sodium salt. Thereupon, 3.3 parts of benzyl chloride are added and the whole is heated on the water-bath for 5 hours, 5 parts of water being added after 4 hours. The colorless sodium salt of the sulphonic acid dissolves thereby to a yellow solution and a small quantity of sodium chloride separates. The solution is poured into 500 parts of hot water and boiled until the alcohol and small amounts of benzyl ether, formed as by-product, are driven off. To this hot solution there is added a small quantity of caustic soda solution in order to keep the non-benzylated sulphonic acid dissolved. The benzylate of the sulphonic acid separates, in most cases, during the evaporation, otherwise after cooling, in the form of reddish-yellow oil which solidifies after some time. Thereupon it is again digested with a small quantity of dilute sulphuric acid; the lumpy mass thus obtained may be triturated, after drying, to form a reddish-yellow powder which melts at 80° C. The product is sparingly soluble in water, even in the heat, nearly insoluble in absolute alcohol, rather easily soluble in alcohol of 75% strength. The sulphonic acid dyes silk, wool and acetate silk greenish-yellow tints.

(6) 2 parts of methyl-benzyl-amino-phenyl-pyridine-sulphonic acid obtainable according to Example 4 are introduced in a finely powdered form into alcoholic caustic soda solution, whereby the colorless sodium salt is formed. It is filtered by suction, dried and heated with 1 part of diethylsulphate in 10 parts of alcohol for 5 hours at 120° C. in a closed vessel, or in 20 parts of alcohol with 1 part of ethyl iodide for 10 hours on the water-bath. The reaction mixture is extracted with 30 parts of hot alcohol, the main quantity of the alcohol used in the extraction is driven off and water and a small quantity of acetic acid are added to the concentrated solution thus obtained. A yellow oil separates which, after standing for some time, solidifies to a light-yellow powder. It may be recrystallized from hot water; in most cases, however, it separates therefrom at first in the form of an oil. When recrystallized from a large quantity of water a light-yellow crystalline powder is obtained which, after sintering, melts unsharply at 305° C. while assuming a red color. In case the compound has separated at first in the form of an oil and has solidified only gradually, it melts at about 285° C.

(7) 2 parts of dimethyl-amino-phenyl-pyridine are cautiously introduced into 20 parts of fuming sulphuric acid (containing 12 grams of sulphuric anhydride pro 10 cc. of sulphuric acid). The mixture is rapidly heated in an oil bath to 160° C. (i. e. the temperature of the bath) and heating is then gradually continued. A turbulent evolution of sulphur trioxide begins at about 170° C. to 180° C. Thereupon the temperature is raised during ½ hour to 210° C. and the reaction is then stopped. After cooling, the reaction mixture is poured on ice and 1 part of sodium hydroxide is added. An excess of barium carbonate is then added to the hot solution and the barium sulphate and carbonate are filtered off. The filtrate is evaporated to dryness in a vacuum-drier, the dried matter is extracted with alcohol and the alcoholic extract is concentrated to about 10 parts. The sodium salt of the new sulphonic acid crystallizes, after cooling, in the form of fine needles; the yield amounts to 2.3 parts.

2 parts of the sodium salt are boiled for 8 hours under reflux with 1½ parts of benzyl chloride and 10 parts of alcohol. The alcohol is then driven off, the residue is dissolved in 50 parts of hot water, the excess of benzyl chloride is steam-distilled and the solution is boiled with a small quantity of animal charcoal. The quaternary benzyl compound crystallizes (very slowly) from the filtrate. The precipitation is completed by addition of sodium acetate. When recrystallized from a large quantity of water, the dyestuff forms fine yellow prisms which melt at about 185° C. and decompose at 195° C. to 196° C.

We claim:

1. The compounds of the general formula:

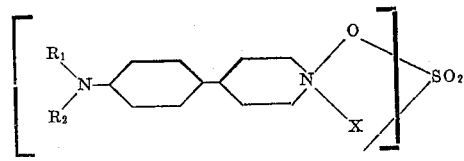

wherein $R_1$ and $R_2$ represent members of the group consisting of alkyl and aralkyl groups of the benzene series and X represents members of the group consisting of hydrogen, alkyl and aralkyl groups of the benzene series, the free bond of the $SO_2$-group being bound at an isocyclic nucleus of the molecule, said compounds being dyestuffs dyeing wool and silk beautiful greenish-yellow tints.

2. The compounds of the general formula:

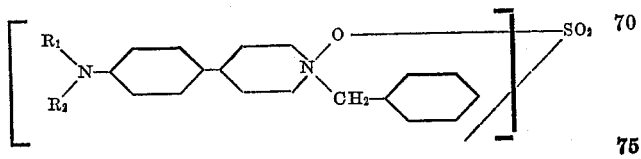

wherein $R_1$ and $R_2$ represent members of the group consisting of alkyl and aralkyl groups of the benzene series, the free bond of the $SO_2$-group being bound at one of the isocyclic nuclei of the molecule, said compounds being dyestuffs dyeing wool and silk beautiful greenish-yellow tints.

3. The compounds of the general formula:

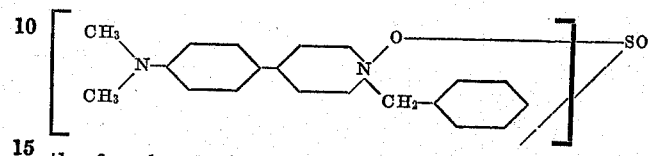

the free bond of the $SO_2$-group being bound at one of the isocyclic nuclei of the molecule, said compounds being dyestuffs dyeing wool and silk beautiful greenish-yellow tints.

4. The compounds of the general formula:

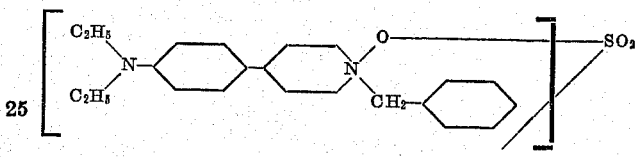

the free bond of the $SO_2$-group being bound at one of the isocyclic nuclei of the molecule, said compounds being dyestuffs dyeing wool and silk beautiful greenish-yellow tints.

5. The compounds of the general formula:

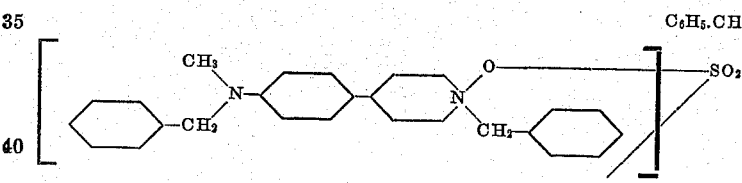

the free bond of the $SO_2$-group being bound at one of the isocyclic nuclei of the molecule, said compounds being dyestuffs dying wool and silk beautiful greenish-yellow tints.

6. The compound of the formula:

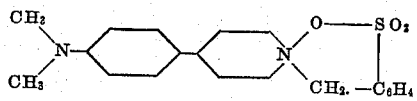

said compound being a dyestuff dyeing wool and silk beautiful greenish-yellow tints.

7. The compound of the formula:

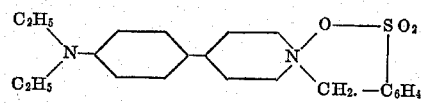

said compound being a dyestuff dyeing wool and silk beautiful greenish-yellow tints.

8. The compound obtained by sulphonating the compound of the formula:

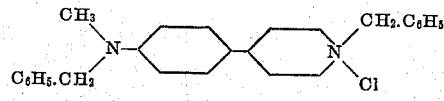

said compound being a dyestuff dyeing wool and silk beautiful greenish-yellow tints.

ERNST KOENIGS.
EDGAR RUPPELT.